No. 610,378. Patented Sept. 6, 1898.
M. BARTHEL.
WAVE MOTOR.
(Application filed Oct. 15, 1897.)
(No Model.)
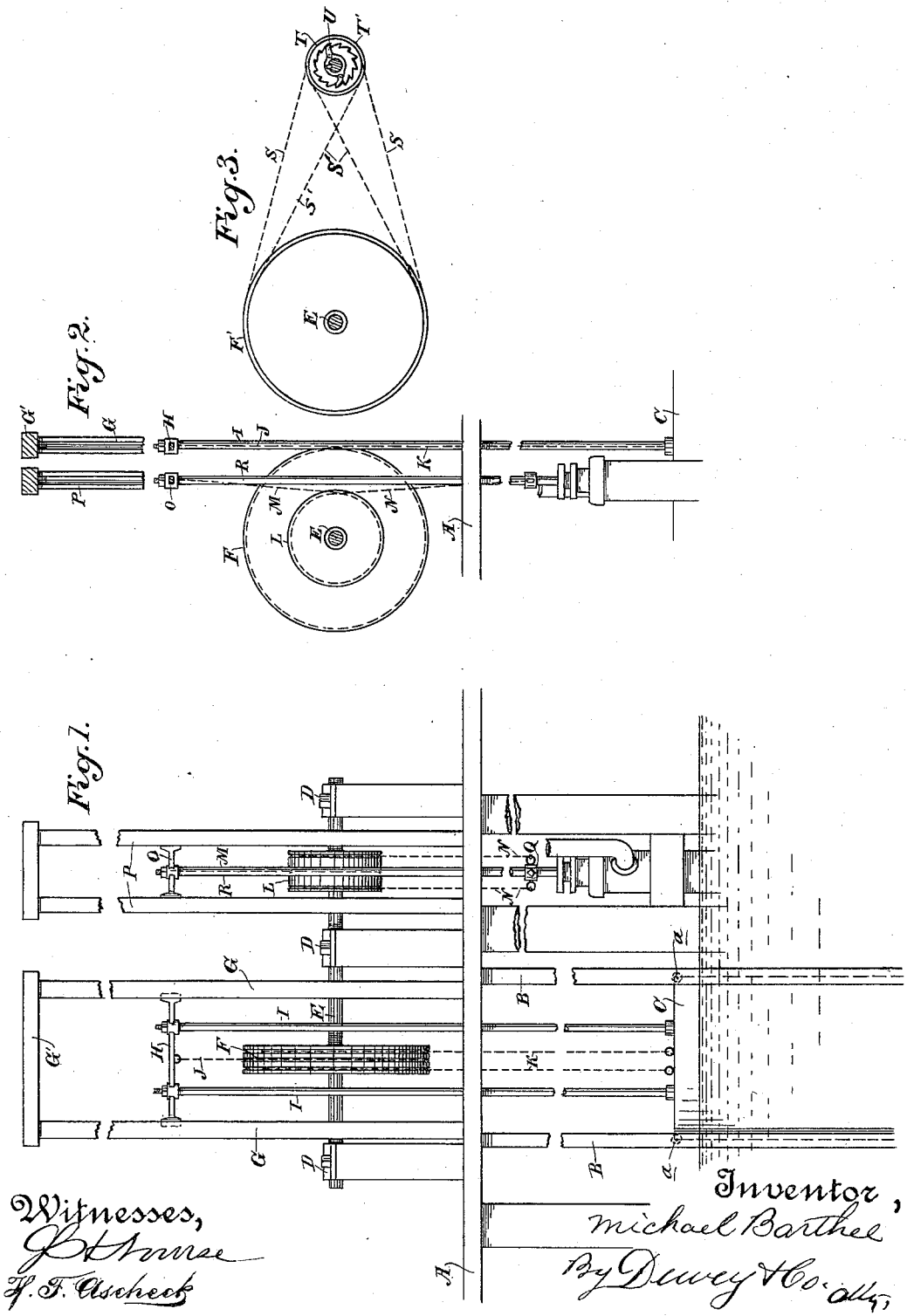
Witnesses,
Inventor,
Michael Barthel
By Dewey & Co. Atty.

UNITED STATES PATENT OFFICE.

MICHAEL BARTHEL, OF SAN JOSÉ, CALIFORNIA.

WAVE-MOTOR.

SPECIFICATION forming part of Letters Patent No. 610,378, dated September 6, 1898.

Application filed October 15, 1897. Serial No. 655,268. (No model.)

*To all whom it may concern:*

Be it known that I, MICHAEL BARTHEL, a citizen of the United States, residing at San José, county of Santa Clara, State of California, have invented an Improvement in Wave-Motors; and I hereby declare the following to be a full, clear, and exact description of the same.

My invention relates to an improvement in apparatus of that class which is designed to be actuated by the rise and fall of the waves.

It consists of the parts and the constructions and combinations of parts hereinafter described and claimed.

Figure 1 is a side elevation of my apparatus. Fig. 2 is an end elevation of the same, showing the application of the power. Fig. 3 shows it applied to a continuous rotary movement.

The object of my invention is to provide a more perfect means for applying the vertically-reciprocating movement caused by the action of the waves to produce corresponding movements in machinery which enables me to apply the power of the waves for useful purposes.

In the construction of my apparatus I have here shown a wharf or structure A, which is built at a sufficient distance away from the shore to provide the proper depth of water and to expose the apparatus to the waves so as to produce the best effect.

B is a hollow casing, which may be made circular or rectangular and of sufficient size to contain the float C, which is fitted therein and is provided with rollers *a* or antifrictional guides to keep it essentially central within the casing. This casing extends to a point above the highest tide and waves, and at the bottom it extends below the lowest tide or trough of waves during the period of low tide. The object of this casing is to protect the float from the horizontal action caused by the "send" of the waves.

It has been customary in the construction of this class of apparatus to expose the vertically-guided float to the free action of the waves; but I have found that the action of the horizontal movement of the waves tends to greatly reduce the efficiency of the float in its vertical rise and fall. By inclosing the float in the casing, which protects it from this horizontal motion, and leaving the casing open below the lowest point of the wave-trough the only action that will affect the float will be the rising and falling action caused by the movement of the wave with its alternate crest and trough.

In order to transmit the vertical motion of the float thus produced, I have shown a suitable framework or structure D built upon the wharf and having a horizontal shaft E suitably journaled thereon. Upon this shaft is mounted a drum F. Fixed with suitable relation to this drum are vertical guide-posts G, having their bases properly secured to the wharf and the top connected by a cross-bar G' or supported in other suitable manner. Between these guides a cross-head H is adapted to move freely. From this cross-head vertical bars I extend down parallel with each other, and at the bottom they are fixed to the top of the float C, so that as the float rises and falls the bars I and the cross-head H partake of its movement. The drum F is secured to the shaft so that its periphery is essentially between the bars I I'.

J is a single wire or other flexible rope coiling around the central portion of the drum and having its upper end connected with the center of the transverse guide H.

K K are two other ropes which coil around the drum upon each side of the rope J, and these ropes extend downwardly and are connected with the float.

The operation of the device will be as follows: As the float rises the vertical bars I will rise with it, and thus push the cross-head H upwardly between the guides. This acts through the rope J to rotate the drum F, and as the rope J uncoils from the drum the two ropes K will correspondingly coil upon it until the float has reached its highest elevation. Upon the recession of the wave the float begins to sink, and acting in the same manner through the bars I it draws the cross-head H down. The ropes K, which connect the float directly with the drum, now act to rotate the drum in the opposite direction, uncoiling from the drum as the float sinks, while the rope J correspondingly coils upon it. By this arrangement the constant rise and fall of the float is communicated by the alternate pull of the ropes J and K, so as to rotate the drum F such portion of a revolution in each direction as the movement of the waves and the rise and fall of the float can produce.

In order to keep the ropes at all times at a proper tension, I employ any suitable take-up device, such as a turnbuckle, by which the tension can be constantly maintained.

In order to apply the power of this device if it is to be employed for pumping purposes, I have shown a drum L mounted upon the shaft E, and around this drum are coiled the ropes M and N. The rope M extends upwardly to a cross-head O, which is slidable upon vertical guides P, and the ropes N extend downward and connect with the cross-head Q, which is here shown fixed to the pump piston-rod R. This piston-rod extends upwardly and connects with the cross-head O, so that as it reciprocates the proper tension is maintained upon the ropes M and N, and the rotation of the drum L, acting through these ropes upon the piston-rod and cross-heads, causes the pump-plunger to be actuated in proportion to the movement of the float and the connected parts.

By arranging the single vertical rope which extends upwardly from the drum and the two ropes upon each side of it extending downwardly I produce a balance, so that the pull in each direction is even and there will be no side drag upon the apparatus.

If it is desired to convert the reciprocating movement of the drum F into a rotary movement, it is done by means of a similar drum F', fixed upon the shaft E, and ropes S pass around this drum and around a smaller drum T, mounted upon a second or counter shaft parallel with the shaft E. Other ropes S' either pass around the same drum adjacent to the ropes S, or, if more convenient, they may be passed around a second drum fixed upon the shaft E, and these ropes S' cross each other, as shown, and pass around a corresponding drum T', which is situated by the side of the drum T. Each of these drums is provided with a well-known pawl-and-ratchet mechanism U, the two mechanisms being constructed to act in opposite directions, so that when the float rises power will be transmitted through the rope or belt S to revolve the drum T in one direction, and through the engagement of the pawl-and-ratchet mechanism it will act to rotate its shaft and any attached machinery in the same direction. When the float sinks, the belt S will move in the opposite direction, oscillating with the movement of its drum F', and the pawl-and-ratchet mechanism U will be disengaged, so that the shaft may continue its motion in the direction to which impulse had been given it. The sinking of the float acts to reverse the movement of the drum F', and this, acting through the cross-belt S' upon its drum T', will through a similar arrangement of pawl-and-ratchet mechanism act to continue the movement of the shaft in the direction given it by the impulse of the belt S. In this manner these belts act alternately upon their drums T T', which are turned continuously in the same direction, and the pawl-and-ratchet mechanisms allow this continued movement by alternately engaging and disengaging with the shaft.

Having thus described my invention, what I claim as new, and desire to secure by Letters Patent, is—

1. In a wave-motor mechanism, a vertically-reciprocable float, an inclosed open-bottomed casing within which the float is freely movable and by which it is protected from the transverse movement of waves and acted upon by the vertical movement only, vertical guides fixed upon a stationary structure in line above the float, a cross-head freely slidable upon said guides, connecting-rods uniting the cross-head with the float, a drum mounted upon a journal-shaft having flexible ropes coiled about its periphery in opposite directions, one of said ropes passing around the center of the drum and extending upward to connect with the cross-head, and two other and separate ropes coiled upon either side of the central rope extending downward connecting with the float, whereby the vertical movements of the float are transmitted to produce a rotary oscillation of the drum, a second drum on the shaft and similar connections with the drum whereby said motion is transmitted to other mechanism.

2. A wave-power mechanism consisting of a vertically-reciprocating inclosed float, vertical parallel guides extending upwardly from a structure fixed with relation to the float and in line above it, a cross-head freely movable upon the guides, parallel rods connecting said cross-head with the float whereby they move in unison, a drum mounted upon a journal-shaft with its periphery essentially in line between the cross-head and the float, ropes coiled in opposite directions around the drum, one of said ropes connecting with the cross-head above and the others with the float below, whereby the vertical reciprocations of the drum are converted into a semirotary oscillatory motion of the drum, a second drum mounted upon the shaft and similar connections between said drum and a pump piston-rod whereby the latter is reciprocated in unison with the movements of the float.

3. In a wave-motor, an inclosed float guided to rise and fall with the movements of the waves, mechanism through which the rising and falling of the float is communicated to produce a rotary oscillatory movement of a drum mounted upon a shaft journaled on a structure fixed with relation to the float, a second drum mounted upon the second shaft receiving motion therefrom, a pump, the plunger-rod of which extends upwardly essentially tangent to the periphery of the drum, cross-heads fixed to said plunger above and below the drum, guides upon which said cross-heads are freely movable, a rope coiled about the central portion of the drum connecting with the center of the upper cross-head, other ropes coiling in opposite directions about the drum upon each side of the first-mentioned rope and connecting with the lower cross-head upon each side of the plunger-rod whereby reciprocating motion is transmitted to said plunger-rod and side draft prevented.

In witness whereof I have hereunto set my hand.

MICHAEL BARTHEL.

Witnesses:
S. H. NOURSE,
JESSIE C. BRODIE.